Aug. 14, 1956  J. L. VODONIK  2,758,915
APPARATUS FOR CONTINUOUS POLYMERIZATION
Filed July 2, 1953  2 Sheets-Sheet 1
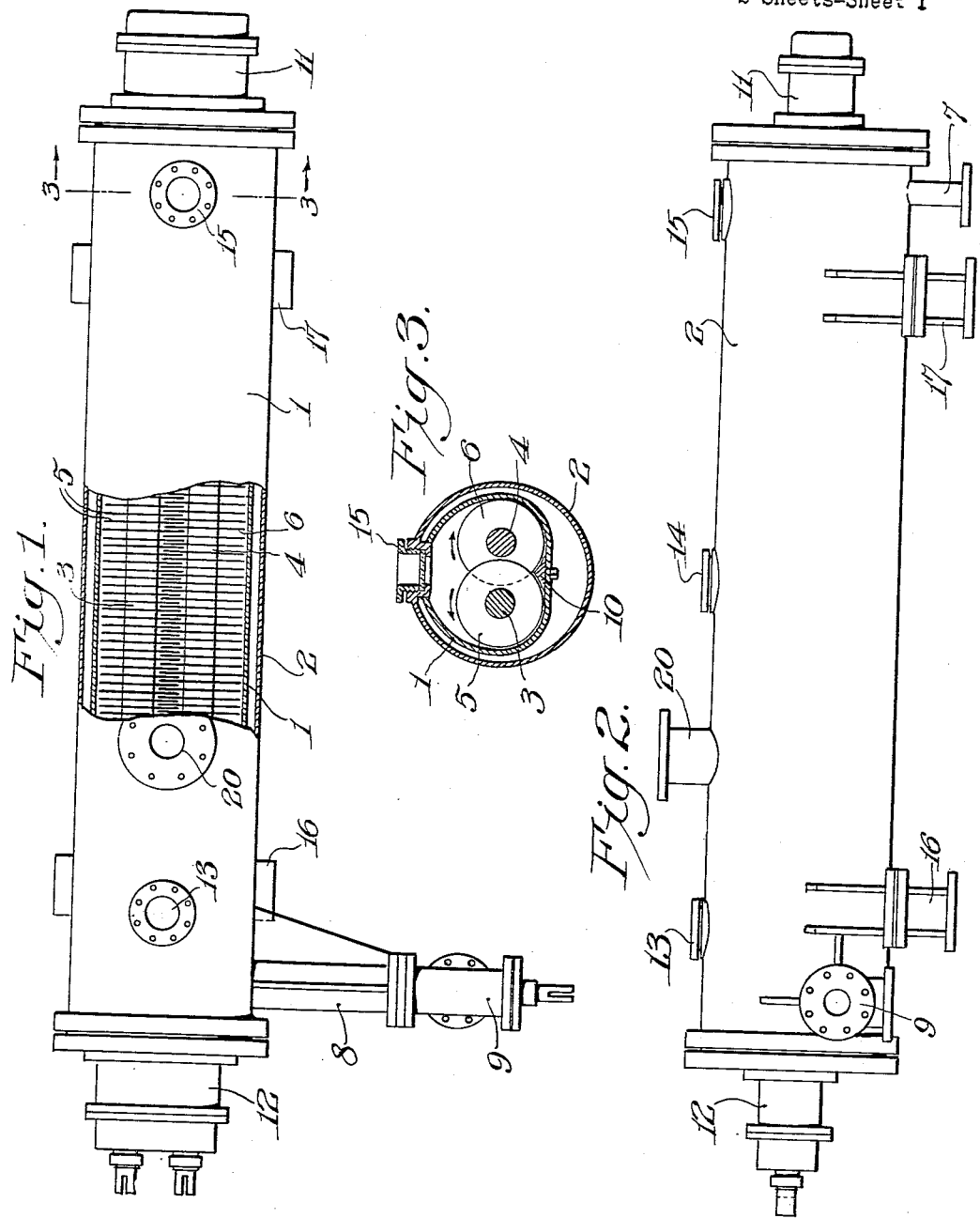
INVENTOR
Joseph L. Vodonik
BY R. Ralph Snyder
ATTORNEY

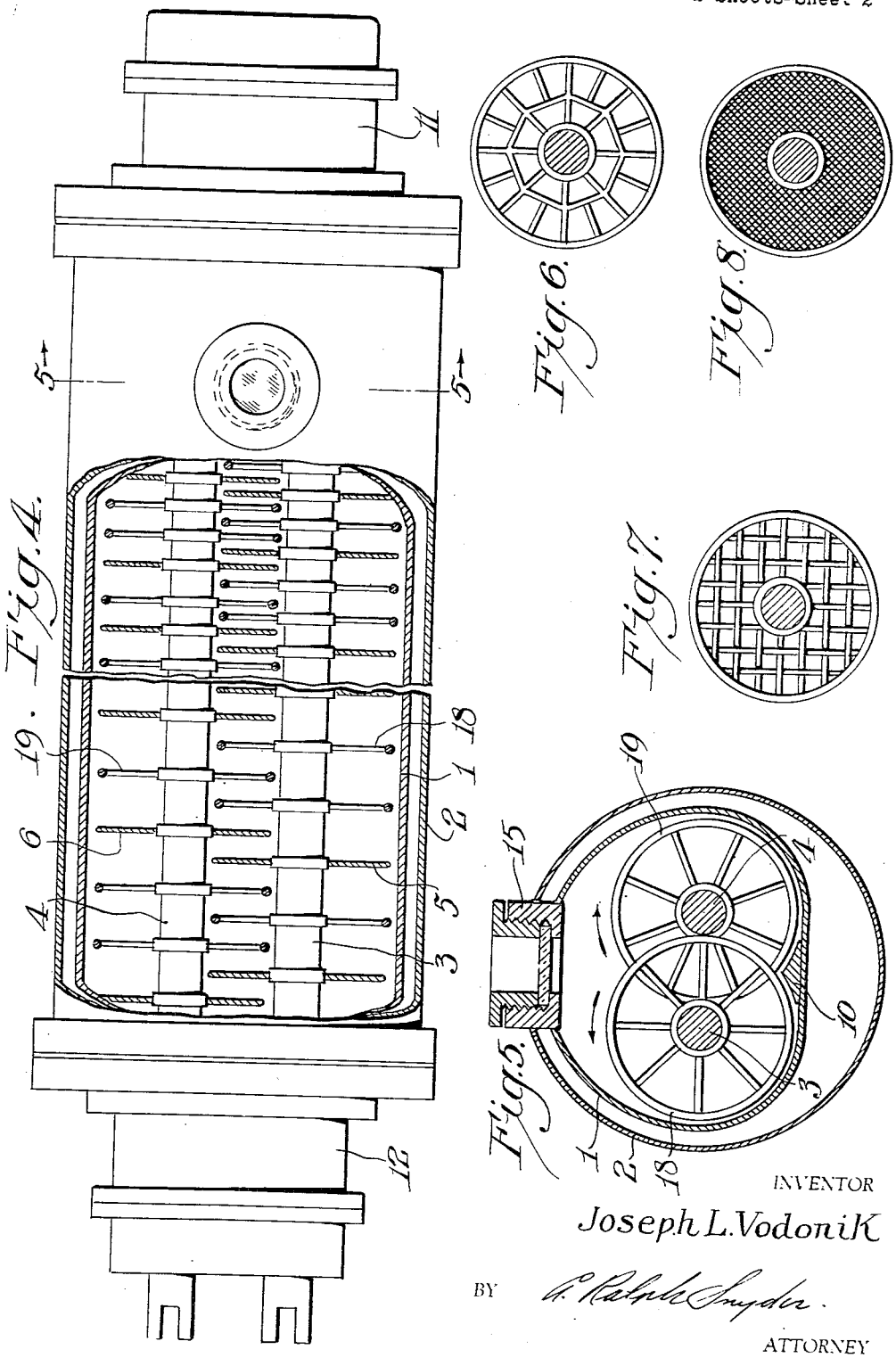

United States Patent Office 2,758,915
Patented Aug. 14, 1956

2,758,915

APPARATUS FOR CONTINUOUS POLYMERIZATION

Joseph Leonard Vodonik, Rocky River, Ohio, assignor to E. I. du Pont de Nemours and Company, Wilmington, Del., a corporation of Delaware Application July 2, 1953, Serial No. 365,741

9 Claims. (Cl. 23—285)

This invention relates to a process and apparatus for carrying out the polymerization of low molecular weight polymers which polymerize with the evolution of vaporous by-products and, more particularly, to a continuous process and apparatus for completing the polymerization of low molecular weight polyethylene terephthalate.

The production of the novel class of film- and fiber-forming linear polyesters of terephthalic acid and a glycol of the series $HO(CH_2)_nOH$ where "$n$" is an integer from 2–10 inclusive, is fully disclosed in U. S. Patent 2,465,319 to Whinfield and Dickson. From a commercial standpoint, one of the most attractive polymers of this class is polyethylene terephthalate; and the most promising process for its production comprises carrying out an ester interchange between ethylene glycol and dimethyl terephthalate to form bis-2-hydroxy-ethyl terephthalate monomer which is polymerized to polyethylene terephthalate under reduced pressure and at elevated temperatures.

Heretofore, polymerization of bis-2-hydroxy-ethyl terephthalate has been carried out batchwise in large reaction vessels or autoclaves wherein provision is made to agitate the polymerizing mass and remove vaporized ethylene glycol.

The necessity for accurate control of, and progressive change in pressure and temperature relationships, particularly in the initial stages of the reaction, to prevent undue vaporization of the monomeric material (which condenses in and consequently plugs condenser lines), and to prevent undue loss of low polymeric material through vaporization, and the necessity for thorough agitation throughout has made it difficult to prepare polyethylene terephthalate by the more commercially attractive continuous process. However, it has been determined that continuous production of polymer can be satisfactorily achieved by carrying out the process in three stages consisting of a first stage wherein the ethylene glycol and dimethyl terephthalate are reacted in a continuous fashion to form bis-2-hydroxy-ethyl terephthalate and/or a very low polymer thereof; a second stage wherein polymerization of the bis-2-hydroxy-ethyl terephthalate and/or very low polymer thereof is polymerized continuously with effective agitation and under progressively decreasing pressure conditions to form a liquid prepolymer; and a third and final stage wherein the prepolymer is further continuously polymerized to form the desired high molecular weight, fiber- and film-forming polyethylene terephthalate.

An object of the present invention is to provide an apparatus and process for continuously polymerizing the prepolymer of bis-2-hydroxy-ethyl terephthalate. Another object is to provide a continuous process and apparatus for polymerizing a prepolymer of bis-2-hydroxy-ethyl terephthalate wherein the polymerizing mass is continuously conducted from one stage to the next without appreciable intermixing of very low molecular weight polymer with higher molecular weight polymer in the latter stages of polymerization whereby to continuously produce a polymer having a uniform viscosity and a relatively narrow range of molecular weight variation. It is a further object to provide a continuous process and apparatus wherein the polymerizing mass is continuously agitated without substantial intermixing of low molecular weight polymer with higher molecular weight polymer in the latter stages of polymerization. It is a still further object of the present invention to provide a continuous process and apparatus wherein high surface area generation is accomplished. It is a still further object to provide a process and apparatus wherein stage-wise hold-up of the polymerizing mass is accomplished. A still further object is to provide an apparatus wherein thorough mixing of the polymerizing mass is effected in each stage of the apparatus. Other objects will be more apparent from the description of the invention which follows.

These objects are accomplished by the present invention which, briefly stated, comprises continuously introducing a liquid prepolymer of bis-2-hydroxy-ethyl terephthalate at a predetermined rate into one end of an elongated, and preferably horizontally disposed, vessel housing a multiplicity of intermeshing, rotating, flat, solid discs which are substantially vertically disposed with reference to the longitudinal axis of the vessel and which serve to divide the elongated vessel into a series of compartments along its length, each compartment being preferably provided with means for generating optimum polymer surface area; maintaining the polymerizing mass under uniform conditions of reduced pressure and elevated temperatures for a time sufficient to produce a polymer of the desired molecular weight; and thereafter withdrawing the resulting polymer from the opposite end of the vessel.

The term "prepolymer" will be employed hereinafter to designate low molecular weight polyethylene terephthalate. Generally, the present apparatus and process is employed to complete the polymerization of a prepolymer having an intrinsic viscosity no less than 0.15. The final intrinsic viscosity may range anywhere between 0.45 and 1.2. Expressed in poises, the initial viscosity of the prepolymer is no less than about 25 poises; and the final viscosity may range anywhere from 1,000 to 3,000 poises or higher.

As used herein, intrinsic viscosity, denoted by the symbol $(n)_0$, is a measure of the degree of polymerization of the polyester and may be defined as:

$$\text{limit } \frac{ln(n)_r}{C} \text{ as } C \text{ approaches } 0$$

wherein $(n)_r$ is the viscosity of a dilute phenol-tetrachloroethane (60–40) solution of the polyester divided by the viscosity of the phenol-tetrachloroethane mixture per se measured in the same units at the same temperature, and C is the concentration in grams of polyester per 100 cc. of solution.

The present invention resides, in part, in the discovery that continuous agitation of a polymerizing mass may be carried out while preventing intermixing of low molecular weight polymer with high molecular weight polymer in the latter stages of polymerization. This is accomplished by providing continuously rotating solid disc agitators which serve to divide the polymerizing mass into individual batches of polymer at different stages of polymerization and substantially prevent by-passing or intermixing of polymer of widely varying molecular weight or viscosity. It is well known that intermixing of a low molecular weight polymer, e. g., having an intrinsic viscosity of about 0.2, with a higher molecular weight polymer, e. g., having an intrinsic viscosity of about 0.65, results in degradation, i. e., reduction in the molecular weight, of the higher molecular weight polymer. Hence, in carrying out polymerization of a mass of prepolymer in a large batch reactor under continuous agitation, the polymerizing mass gradually increases in molecular weight, i. e., viscosity; and the entire batch of polymer is substantially uniform, i. e., at substantially the same molecular weight. In a continuous process, however, it is necessary to move a continuous mass of polymer through a vessel, the inlet prepolymer being of low molecular weight and the outlet polymer being of higher molecular weight, and prevent intermixing, i. e., by-passing, of the low molecular weight polymer with the higher molecular weight polymer being withdrawn at the outlet end of the vessel.

The invention will now be described with reference to the accompanying drawings wherein:

Figure 1 is a top plan view of one embodiment of the apparatus designed in accordance with the principles of this invention; parts are broken away to show the intermeshing disposition of the discs;

Figure 2 is a side elevation of the embodiment of Figure 1;

Figure 3 is a cross-section on the line 3—3 of Figure 1;

Figure 4 is a view similar to Figure 1 showing the preferred modification of disc and wheel assembly;

Figure 5 is a cross-sectional view on the line 5—5 of Figure 4;

Figure 6 shows a wheel modification;

Figure 7 shows another wheel modification; and

Figure 8 shows still another wheel modification.

Referring particularly to Figure 1, an embodiment of an apparatus within the scope of the invention comprises an elongated cylindrical vessel 1, having a jacket 2 providing a space around the vessel through which may be circulated Dowtherm or the like to effect the temperature control necessary to promote polymerization. The jacketed vessel is substantially horizontally positioned on supports 16 and 17. Vessel 1 houses parallel shafts 3 and 4 which are driven in opposite directions by suitable drive means (not shown). A series of solid flat discs 5 are mounted on shaft 3 for rotation therewith, the plane of each disc being substantially perpendicular to the axis of the shaft. A series of identical discs 6 are similarly mounted on shaft 4 to intermesh with discs 5. The rotating action of the intermeshing discs appears to apply a positive pressure upon the viscous mass of prepolymer which is continuously pumped or forced into one end of the vessel through inlet means 7 (Fig. 2) therein provided, so that the prepolymer is caused to travel continuously to the opposite end of the vessel where it is removed through a discharge conduit 8 provided with a screw discharge screw pump 9 to facilitate flow of the now extremely viscous polymer stream. The pumping pressure exerted upon the liquid mass by the intermeshing discs is greatest at the lower nip of the discs; and in order to prevent subtsantial by-passing of low molecular weight or less viscous prepolymer along the bottom of the vessel toward the outlet end, a fillet 10 is installed below the bottom nip of the intermeshing discs as shown in Figure 3. Thus, each pair of discs in combination with the fillet defines a "compartment" in which an increment of the stream of polymer is momentarily segregated from an increment of polymer of lesser molecular weight in the compartment immediately preceding and an increment of polymer of higher molecular weight in the next succeeding compartment. Volatile by-products of the polymerization, chiefly glycol, are drawn off as vapors through the conduit 20, which is also connected to a source (not shown) of vacuum effective to maintain an atmosphere of reduced pressure (i. e., below atmospheric pressure) in the vessel. Suitable seals 11 and 12 are provided at the end shaft supports. Glass-covered sight openings 13, 14, and 15 may be provided for the purpose of permitting inspection of the interior of the vessel at all times.

With respect to the general mechanism of carrying out the polymerization of bis-2-hydroxy-ethyl terephthalate or completing the polymerization of a prepolymer thereof, the process is regarded as consisting of two consecutive processes: (1) the chemical reaction to form larger molecules and dissolved glycol, and (2) the physical process of evaporating the dissolved glycol. Surface area generation affects these processes. In accordance with the law of mass action, the rate at which the chemical reaction proceeds is affected by the amount of free glycol. In other words, if the glycol is not continually evaporated and removed from the reaction mass, the glycol builds up to the point of equilibrium; and the reaction is substantially stopped. Hence, evaporation of glycol is a diffusion process, the rate of which is affected by the exposed area, resistance to diffusion, and the driving force as defined by the following equation:

$$\frac{-dG}{d\theta} = \frac{AD(P-Po)}{B}$$

where, $\frac{dG}{d\theta}$ = lbs. of glycol removed per hour $A$ = exposed area $(P-Po)$ = driving force, the difference between the vapor pressure, $P$, of glycol dissolved in the polymer and $Po$, the vacuum in the reactor.

$\frac{P}{D}$ = resistance to diffusion where "B" equals the thickness of the polymer film through which glycol must diffuse and "D" equals coefficient of diffusion.

The two elements "A" and "B" in the above equation are related to agitation. The variation "P," however, is affected by the rate of chemical reaction and the rate at which glycol is removed; and "P" varies so that the rate of reaction always equals the rate of glycol evaporation. In designing an apparatus for carrying out the process of the present invention, it is important that the apparatus be capable of performing three essential functions: (1) generate a maximum of surface area at the minimum power consumption; (2) substantially prevent by-passing of low molecular weight polymer into the region of higher molecular weight polymer; and (3) provide efficient and thorough mixing within each compartment of the apparatus.

In the apparatus illustrated in Figures 1–3, the surface area generated is generally satisfactory, it being understood that the rate of feed of polymer into the vessel is so regulated that the level of the polymer mass is substantially no higher than the height of the rotating shafts above the bottom of the vessel. Hence, surface area is generated as the rotating discs pick up polymer from the bottom of the vessel and bring this polymer to the upper surface. It should be understood, however, that at relatively high rates of rotation, the polymer, particularly the more viscous material, tends to stick to the surfaces of the solid discs; and in such instances, the same polymer is brought to the surface. Furthemore, the surface drag of the rotating discs having polymer sticking to the surfaces thereof is in many cases excessive for the magnitude of the surface area generated.

This difficulty is substantially obviated in the more preferred embodiment illustrated in Figures 4 and 5, which is essentially similar to that of Figures 1, 2 and 3 except that the intermeshing components are made up of a series of alternate solid discs and open, e. g., spoked, wheels. This particular arrangement has been found to accomplish more efficiently the desired functions of the apparatus, as mentioned hereinbefore, that is, high surface area generation at the minimum power consumption, and substantial prevention of by-passing of low molecular weight polymer into the region of higher molecular polymer. Specifically, the apparatus illustrated in Figure 4 is divided into a plurality of compartments by pairs of solid discs 5 and 6, and fillet 10, as previously described. Each compartment contains agitating means in the form of intermeshing wheels 18 and 19 (fixedly mounted on shafts 3 and 4 respectively) which have been found to promote efficient mixing of the liquid polymer within a compartment while not creating any considerable drag between the surface of the spokes and the molten polymer, this resulting in reduced power requirements to rotate the shafts containing the intermeshing components. The intermeshing wheels may be of any desired design so long as they present a substantially open structure in contrast to the solid discs. For example, in place of the simple spoke wheels of Figure 5, one may employ wheels of the design shown in Figures 6, 7, and 8.

It should be understood that the theoretical number of compartments required for minimum reaction time, i. e., a compartment for purposes of discussion is meant to consist of intermeshing wheels bounded on both sides by intermeshing solid discs, will differ for the particular polymer being polymerized, the degree to which polymerization is to be carried out, e. g., the particular molecular weight desired, and the rate of throughput of prepolymer, or the rate at which polymerization is to be carried out. Depending upon these conditions, the theoretical number of compartments required, and this is usually less than the actual number required, the actual number being determined by experimentation, may be calculated in accordance with theoretical discussions presented in a number of existing publications. For example, most polymerization processes, including the proces of polymerizing bis-2-hydroxy-ethyl terephthalate, may be carried out, as mentioned hereinbefore, in a single large batch reactor. The batch reactor is normally operated by introducing low molecular weight polymer into the reactor and carrying out polymerization to produce a higher molecular weight polymer. A single batch reactor may be fed continuously with a low molecular weight polymer, and higher molecular weight polymer may be continuosly withdrawn from the reactor. To carry out a continuous reaction in the batch-type reactor, however, greater efficiency, particularly from the standpoint of polymer quality and homogeneity, may be obtained by conducting the polymerizing mass continuously through a sereis of individual batch reactors. This, in essence, is what the present process and apparatus provides for, except that the unique design of the present apparatus provides for carrying out the reaction continuously in a single vessel. The net result of making preliminary calculations in accordance with existing theoretical approaches is to ascertain for a particular reaction under particular conditions the number of stages beyond which no further advantage, insofar as total reaction time is concerned, is obtained by employing additional stages. A procedure which may be employed for calculating the theoretical number of stages or batch reactors required for the particular reaction of polymerizing a prepolymer of polyethylene terephthalate is found in Jones, R. W., Chemical Engineering Progress, 47, 46–48 (1951), titled "A General Graphical Analysis of Continuous Reactions in a Series of Agitated Vessels." Hence, as a result of employing calculations in accordance with this article, it was found that no further improvement, insofar as the total reaction time required is concerned, could be obtained by employing more than about 7 or 8 stages or individual batch reaction vessels. Consequently, in actual operation, in order to allow for stage inefficiency, about 12 stages or compartments were employed in an apparatus similar to that shown in Figure 4. It should be understood, however, that such theoretical calculations are based strictly upon the consideration that the reaction is to be carried out in a series of individual batch reactors, individually agitated, and that the resulting figure is strictly a guide for carrying out actual experimentation to establish the optimum number of stages or compartments actually required.

As emphasized hereinbefore, the apparatus of the present invention provides for substantial elimination of by-passing of low molecular weight polymer into higher molecular weight polymer by employing solid rotating discs, which, in combination with a continuous fillet extending along the bottom of the reactor below the bottom nip of the intermeshing discs and wheels, divide the reaction vessel into compartments. Another factor which contributes toward reducing by-passing is the relative position of the reaction vessel with respect to the horizontal plane. Experimentation has shown that the vessel should be positioned substantially horizontal, this position providing for movement of the viscous polymer by gravity flow. On the other hand, lowering the outlet end of the vessel below the inlet end increases the effect of gravity upon the flow of liquid polymer through the vessel, this increased effect of gravity contributing to a more rapid flow of polymer through the vessel and, hence, resulting in increased by-passing of low molecular weight polymer. On the other hand, raising of the outlet end of the vessel above the inlet end places most of the burden of moving the polymer through the vessel upon the pumping action of the intermeshing components. In such cases, it is usually necessary to install a number of flights of intermeshing screws in at least two or three positions along the lengths of the parallel shafts in order to promote more efficient pumping of the polymer mass. These screw flights are inserted in place of some of the solid discs.

It is also to be noted that the relative position of the apparatus of the present invention influences the level of polymer in the vessel, the level of polymer also being influenced by the throughput and the R. P. M. (revolutions per minute) of the intermeshing components. Preferably, the liquid level should be maintained at a point no higher than the height of the shafts above the bottom of the vessel; and this preferred level is normally readily obtained when the vessel is positioned horizontally. On the other hand, if the liquid level is too high, foaming of the polymerizing mass occurs; and the foam tends to be drawn into the glycol outlet. It is obvious that the maintenance of a low liquid level, i. e., substantially below the parallel shafts, merely reduces the capacity of the equipment; and such low levels are not desirable for economic operation. In the normal operation of the present apparatus, the liquid level decreases from that at the inlet end as the liquid polymer moves toward the outlet. It should be pointed out, however, that the apparatus of the present invention may be operated as a mixer, i. e., for mixing or blending individual streams of molten polymers having different viscosities. In this capacity, the apparatus would be operated by substantially filling the casing of the apparatus with the liquids being mixed.

Figure 4 also illustrates a preferred gradation with respect to the spacing between adjacent discs and wheels from the inlet to the outlet. The spacing between these components is increased at the outlet of the vessel for the purpose of decreasing the agitator power requirements and to prevent appreciable plugging of the spacing between adjacent discs and wheels as a result of the appreciable increase in the viscosity of the liquid polymer. Generally, spacing between adjacent wheels may be varied from about 2" at the inlet to about 3" at the outlet. A spacing of greater than about 4" was found to be excessive, and such spacing did not provide for efficient agitation. On the other hand, the spacing between adjacent rotating discs may also be increased from about ⅝" at the inlet to about 1⅛" at the outlet. Obviously, the particular spacings will vary with the particular material being polymerized and with other reaction conditions; but in all cases, it is preferred to increase the spacing between intermeshing components in the region of the vessel near the outlet.

The operational characteristics of the apparatus of the present invention will vary depending upon the degree to which the apparatus is compartmentalized. By operation characteristics is meant, for example, the effect of R. P. M. upon hold-up time; the effect of R. P. M. on pumping efficiency; power consumed for agitation as affected by polymer viscosity; and other general relationships between such variables making up the conditions of operation as rate of throughput, inlet and outlet viscosities, rate of polymerization as affected by type of catalyst and catalyst concentrations, temperature, and reaction pressure. Regardless of the length of the reaction vessel, the vessel is considered to be highly compartmentalized when all of the intermeshing components are solid discs.

The rate at which polymerization is carried out, which, in turn, affects the throughput of polymerizing material, is greatly influenced by the particular polymerization catalyst employed. Various well known polymerization catalysts include zinc borate as described in U. S. Patent No. 2,518,283, litharge as described in U. S. Patent No. 2,534,028, and antimony trioxide as described in copending application U. S. Serial No. 248,890 filed September 28, 1951 in the name of H. R. Billica, now Patent No. 2,647,885. Various other polymerization catalysts, as well as optimum reduced pressure and elevated temperature conditions, are disclosed in U. S. Patent No. 2,465,319 to Whinfield and Dickson. In general, the liquid polymerizing mass should be maintained under reduced pressures less than 10 mm. of mercury and at a temperature between 265–290° C. during its passage through the apparatus of this invention. The rate at which polymerization is carried out has a marked influence upon the viscosity profile, i. e., as depicted by plotting viscosity of the polymer against various distances along the length of the reaction vessel from inlet to outlet. In other words, for a polymerization rate requiring a one-hour hold-up, the average viscosity may be in the neighborhood of 700 poises, whereas for a rate requiring a two-hour hold-up, the average viscosity may be 1,000 poises. Hence, the higher the viscosity profile, the greater the hold-up time and the power consumed for agitation. In general, the lower the rate of polymerization or the lower the throughput, the greater is the power consumption.

The efficiency of the present apparatus in substantially eliminating excessive by-passing of low molecular weight polymer into higher molecular weight polymer provides for producing a polymer having a relatively narrow molecular weight distribution. On the other hand, stringent control over the reaction must be maintained in order to produce a polymer of uniform viscosity. Particularly, with the preferred embodiment of the present apparatus, variations in the pressure maintained in the reactor or the R. P. M. or both may be employed to adjust the operation of the apparatus to correct for viscosity changes which occur in the polymerizing mass within the vessel. Therefore, it is necessary to anticipate such viscosity changes in the reactor in order to obtain the final product of the desired molecular weight. Viscosity changes in the reactor are compensated for by adjusting the pressure in the reactor, the R. P. M., or both. The reaction may be controlled by employing a continuous measurement of the viscosity of the effluent or polymerizing mass at a strategic point in the reactor to trigger a means of adjusting the pressure in the reactor or the R. P. M. or both to a lower or higher value in order to obtain a polymer product having a relatively uniform viscosity within a desired range.

A typical example of controlling viscosity in an apparatus of the present invention is as follows:

A recording ammeter (a Brown Company recorder-controller) is employed to record continuously the current in amps. drawn by the motor drive (at constant R. P. M.) for an apparatus of the present invention, the apparatus being that described in Example 2 presented hereinafter. The recorder-controller is set at a particular amperage so that an air signal is triggered whenever the recorded amperage differs from that at which the recorder-controller is set. For example, in the apparatus described in Example 2, a setting of the ammeter at 11.5 amps. means that the intrinsic viscosity of the effluent polymer will be 0.6 for a given constant set of conditions, that is, for a constant R. P. M., a constant throughput of material, a constant liquid level in the vessel, and a temperature within a given range. The air signal generated by the recording-controlling instrument is transmitted to the vacuum control system which increases or decreases the vacuum in accordance with the nature of the air signal transmitted from the recording-controlling instrument. When the amperage rises above the value at which the controller is set, this means that the power is increasing and, hence, viscosity is increasing. The air signal to the vacuum control system acts to decrease the vacuum when the viscosity rises. On the other hand, the vacuum is increased when the power consumption of the apparatus, as reflected by amperage, falls below the value at which the recorder-controller is set.

Another typical arrangement for controlling viscosity in an apparatus of the present invention by continuous measurement of the viscosity of the effluent is as follows:

A small quantity of the effluent polymer is continuously pumped at a constant rate through a by-pass system, and the polymer enters a continuous viscosity measuring system through a pipe jacketed with "Dowtherm" to maintain the temperature of the polymer within a specified range. The polymer is then pumped by means of a gear pump into a cavity, through a capillary tube, into a second cavity, and finally back into the main stream of effluent polymer. The pressure in each of the cavities is measured by means of Taylor Instrument Company pressure bulbs. By combining the output signals of these two pressure measuring instruments, e. g., by means of a relay, a direct reading of pressure drop across the capillary is obtained. The resulting reading is directly proportional to the melt viscosity of the effluent polymer. A significant change in the pressure drop across the capillary is translated into a signal to the vacuum control system which increases or decreases the vacuum in the polymerization apparatus in accordance with the nature of the signal. An increase in the pressure drop across the capillary indicates an increase in the viscosity of the effluent, and the signal to the vacuum control system would result in increasing the pressure in the polymerization apparatus. On the other hand, a decrease in the pressure drop indicates a decrease in viscosity and, hence, a reduction of the pressure in the apparatus is required.

The following specific examples further illustrate the principles and practice of this invention.

EXAMPLE 1

A continuous ester interchange reaction column was employed to react continuously ethylene glycol and dimethyl terephthalate. This continuous reaction column produced a continuous supply of a liquid comprising bis-2-hydroxy-ethyl terephthalate and a low molecular weight polymer thereof having a degree of polymerization less than 4, on the average. "Degree of polymerization" (DP) of less than 4, on the average, means that the average chain length or number of monomer units connected together is less than 4. It should be understood that the degree of polymerization of the prepolymer which constitutes the feed into the process and apparatus of this invention is appreciably higher, roughly up to 65 times higher.

The bis-2-hydroxy-ethyl terephthalate and very low molecular weight polymer thereof having a degree of polymerization of less than 4, on the average, were continuously fed into the bottom of a continuous "prepolymerization" column. Ethylene glycol was continuously withdrawn from the top of an entrainment separator at the top of the column, the glycol being in vapor form; and liquid molten polyethylene terephthalate having an intrinsic viscosity between 0.20 and 0.25 was withdrawn from the liquid take-off just below the uppermost plate of the prepolymerization column.

The prepolymer was fed continuously into an embodiment of the apparatus of the present invention as illustrated in Figures 1–3, and the conditions of the subsequent polymerization reaction are given in Table I. The apparatus illustrated in Figures 1–3 was about 8 feet in length and 2 feet in diameter. Each shaft on which the solid discs were mounted was 4″ in diameter and the discs were 9½″ in diameter and ⅛″ in thickness. The discs were fabricated from stainless steel plate. On each shaft were mounted 130 discs.

*Table I*

| Rate of feed of DMT[1] to continuous ester interchange column | 30 lb./hr. | 51.5 lb./hr. | 74.5 lb./hr. | 97.0 lb./hr. |
|---|---|---|---|---|
| Mol ratio glycol/DMT to ester interchange column | 2.8 | 2.16 | 1.99 | 1.81 |
| Total pounds glycol/hr. to ester interchange column | 27.4 | 35.6 | 47.5 | 56.4 |
| Conc. of catalysts based on DMT: | | | | |
| Lithium hydride ⎱ ester interchange | 0.005 | 0.005 | 0.0052 | 0.0052 |
| Zinc acetate ⎰ | 0.035 | 0.035 | 0.036 | 0.036 |
| Antimony trioxide | 0.035 | 0.035 | 0.036 | 0.036 |
| Intrinsic viscosity of product | 0.25 | 0.23 | 0.22 | 0.20 |
| Temperature of inlet | (2) | (2) | (2) | (2) |
| Temperature of outlet °C | 285–310 | 285–310 | 285–310 | 285–310 |
| Pressure inlet and outlet, mm. Hg | 3.5 | 3.5 | 3.5 | 3.0 |
| Rate of polymer take-off, lb./hr. | 29 | 50 | 73 | 95 |
| Intrinsic viscosity | 0.65 | 0.6–0.64 | 0.54–0.58 | 0.47–0.51 |
| Hold-up time (approx.) hrs. | 10 | 6 | 4 | 3 |
| Rate of rotation of discs (R. P. M.) | 12 | 12 | 12 | 12 |

[1] Dimethyl terephthalate.
[2] Approximately 275°.

EXAMPLE 2

A continuous ester interchange reaction column was employed to react continuously ethylene glycol and dimethyl terephthalate. This continuous reaction column produced a continuous supply of a liquid comprising bis-2-hydroxy-ethyl terephthalate and a low molecular weight polymer thereof having a degree of polymerization less than 4, on the average.

The bis-2-hydroxy-ethyl terephthalate and very low molecular weight polymer thereof having a degree of polymerization of less than 4, on the average, were continuously fed into the bottom of a continuous "prepolymerization" column. Ethylene glycol was continuously withdrawn from the top of an entrainment separator at the top of the column, the glycol being in vapor form; and the liquid molten polyethylene terephthalate having an intrinsic viscosity between 0.19 and 0.22 was withdrawn from the liquid take-off just below the uppermost plate of the prepolymerization column.

The prepolymer was fed continuously into an embodiment of the apparatus of the present invention as illustrated in Figures 4 and 5, and the conditions of the subsequent polymerization reaction are given in Table II. The cylindrical vessel housing the intermeshing components was approximately 8′ in length and had a diameter of about 2′. The solid discs were 9⅝″ in diameter at the inlet end and were increased to 10″ in diameter at the outlet end. These solid discs were fabricated from ⅛″ stainless steel plate. The wheels employed at the inlet end of the reactor were 9⅝″ in diameter and were 10″ in diameter at the outlet end. These wheels were fabricated from 3/16″ diameter stainless steel rod and contained 8 spokes. At positions approximately one-third and two-thirds the way along each shaft containing the intermeshing components were positioned short screw flights which aided in increasing the pumping pressure upon the liquid polymerizing mass. A third screw flight was located at the end of each shaft. These screw flights were necessary because the reaction vessel was inclined, i. e., the outlet end was approximately 8″ above the inlet end. Such screw flights are not necessary when the reactor is positioned substantially horizontally.

*Table II*

| Rate of feed of DMT to continuous ester interchange column | 95 lb./hr. | 100 lb./hr. | 116 lb./hr. | 126 lb./hr. | 130 lb./hr. | 136 lb./hr. | 150 lb./hr. | 157 lb./hr. |
|---|---|---|---|---|---|---|---|---|
| Intrinsic viscosity of feed to reactor | 0.19–0.22 | 0.19–0.22 | 0.19–0.22 | 0.19–0.22 | 0.19–0.22 | 0.19–0.22 | 0.19–0.22 | 0.19–0.22 |
| Temperature of feed (° C.) | 271 | 276 | 270 | 278 | 276 | 270 | 260 | 275 |
| Temperature at inlet end (° C.) | 274 | 276 | 273 | 279 | 279 | 271 | 273 | 276 |
| Temperature at center of reactor (° C.) | 281 | 277 | 277 | 283 | 288 | 275 | 277 | 286 |
| Temperature of effluent (° C.) | 285 | 279 | 282 | 290 | 296 | 280 | 284 | 296 |
| Intrinsic viscosity of effluent | 0.58 | 0.59 | 0.57 | 0.59 | 0.60 | 0.61 | 0.58 | 0.61 |
| Pressure in reactor (mm. Hg) | 3.5–4.5 | 2.3–2.6 | 1.8–2.8 | 2.6–3.1 | 4.6–4.8 | 1.5±0.1 | 1.0±0.1 | 2.3–3.1 |
| Rate of rotation of discs and wheels (R. P. M.) | 28 | 19 | 28 | 28 | 35 | 28 | 28 | 35 |
| Rate of polymer take-off | (1) | (1) | (1) | (1) | (1) | (1) | (1) | (1) |

[1] Substantially the same as the rate of feed of DMT to continuous ester interchange column.

Although the process and apparatus of the present invention have been described specifically with respect to carrying out the polymerization of prepolymers of bis-2-hydroxy-ethyl terephthalate, it should be emphasized that the present process and apparatus may be employed to carry out the polymerization of similar types of monomeric materials which polymerize with the evolution of vaporous by-products which are more volatile than the resulting desired product. Prepolymers which may be polymerized in the manner described herein include polyesters described in U. S. Patents Nos. 2,071,250 and 2,071,251, such as polyethylene sebacate; copolyesters of the type described and claimed in copending applications U. S. Serial Nos. 150,811 and 150,812 filed March 20, 1950 in the name of M. D. Snyder, now Patent No. 2,623,033 and Patent No. 2,623,031, respectively; and modified polyethylene terephthalates, the modifier being selected from the following acids including esters thereof; isophthalic acid, hexahydro terephthalic acid, bibenzoic acid, sebacic acid, etc.

I claim:

1. Polymerization apparatus comprising in combination a pair of substantially horizontally disposed, parallel, oppositely driven shafts, a series of spaced solid flat discs fixedly mounted on each shaft substantially perpendicular to the axis thereof, the discs on one shaft intermeshing with the discs on the other shaft, a casing housing said intermeshing discs and having an interior contour corresponding closely to the contour of the lower half of said intermeshing discs, said discs serving to divide said casing into a series of compartments along its length, polymer inlet means at one end of said casing, polymer outlet means at the other end of said casing, vapor outlet means in said casing, vacuum means for maintaining the atmosphere in said casing at reduced pressures, and means for maintaining the atmosphere in said casing at elevated temperatures.

2. Polymerization apparatus according to claim 1 wherein the spacing between discs increases from the polymer inlet to the polymer outlet.

3. Polymerization apparatus according to claim 1 wherein a series of intermeshing open wheels are fixedly mounted on said shafts between alternate pairs of intermeshing discs.

4. Polymerization apparatus comprising in combination a pair of substantially horizontally disposed, parallel, oppositely driven shafts, a series of spaced solid flat discs fixedly mounted on each shaft substantially perpendicular to the axis thereof, the discs on one shaft intermeshing with the discs on the other shaft, a casing housing said intermeshing discs and having an interior contour corresponding closely to the contour of the lower half of said intermeshing discs, said discs serving to divide said casing into a series of compartments along its length, polymer inlet means at one end of said casing, polymer outlet means at the other end of said casing, vapor outlet means in said casing, vacuum means for maintaining the atmosphere in said casing at reduced pressures, means for maintaining the atmosphere in said casing at elevated temperatures, and means responsive to a change in viscosity of polymer at a predetermined location in said casing for changing the pressure of the atmosphere in said casing.

5. Polymerization apparatus according to claim 4 wherein a series of intermeshing open wheels are fixedly mounted on said shafts between alternate pairs of intermeshing discs.

6. Polymerization apparatus according to claim 5 wherein the spacing between the discs and between the wheels increases from the polymer inlet to the polymer outlet.

7. Polymerization apparatus comprising in combination a pair of substantially horizontally disposed, parallel, oppositely driven shafts, a series of spaced solid flat discs fixedly mounted on each shaft substantially perpendicular to the axis thereof, the discs on one shaft intermeshing with the discs on the other shaft, a casing housing said intermeshing discs and having an interior contour corresponding closely to the contour of the lower half of said intermeshing discs, said discs serving to divide said casing into a series of compartments along its length, polymer inlet means at one end of said casing, polymer outlet means at the other end of said casing, vapor outlet means in said casing, vacuum means for maintaining the atmosphere in said casing at reduced pressures, means for maintaining the atmosphere in said casing at elevated temperatures, and means responsive to a change in viscosity of effluent polymer at said polymer outlet means for changing the pressure of the atmosphere in said casing.

8. Polymerization apparatus according to claim 7 wherein a series of intermeshing open wheels are fixedly mounted on said shafts between alternate pairs of intermeshing discs.

9. Polymerization apparatus according to claim 8 wherein the spacing between the discs and between the wheels increases from the polymer inlet to the polymer outlet.

References Cited in the file of this patent

UNITED STATES PATENTS

| Number | Name | Date |
|---|---|---|
| 1,592,231 | Strader | July 13, 1926 |
| 2,170,303 | Helstrup | Aug. 22, 1939 |
| 2,494,588 | Skoogland | Jan. 17, 1950 |
| 2,630,302 | Jones | Mar. 3, 1953 |
| 2,665,197 | Rowland | Jan. 5, 1954 |